United States Patent [19]
Hutter et al.

[11] Patent Number: 5,588,910
[45] Date of Patent: Dec. 31, 1996

[54] AIR OUTLET REGISTER FOR AN OPENING IN A VEHICLE

[75] Inventors: Robert J. Hutter, Plymouth; Christopher J. Martin, Northville, both of Mich.; Thomas W. Roesner, Pulheim, Germany

[73] Assignee: Ford Motor Company, Dearborn, Mich.

[21] Appl. No.: 576,931

[22] Filed: Dec. 21, 1995

Related U.S. Application Data

[63] Continuation of Ser. No. 311,990, Sep. 26, 1994, abandoned.

[51] Int. Cl.$^6$ ........................................ B60H 1/34
[52] U.S. Cl. ........................ 454/154; 454/155; 454/316; 454/324
[58] Field of Search .................. 454/108, 109, 454/152, 154, 155, 314, 315, 316, 324

[56] References Cited

U.S. PATENT DOCUMENTS

| | | | |
|---|---|---|---|
| 622,375 | 4/1849 | Leather | 454/316 |
| 2,759,411 | 8/1956 | Jenson | 454/316 |
| 2,928,333 | 3/1960 | Madison . | |
| 2,982,197 | 5/1961 | Roberts . | |
| 3,736,858 | 6/1973 | Mercier | 454/316 |
| 3,861,281 | 1/1975 | Godwin | 454/155 |
| 3,949,656 | 4/1976 | Löhmann . | |
| 4,610,196 | 9/1986 | Kern | 454/155 X |
| 4,664,022 | 5/1987 | Oddenino | 454/155 |
| 4,686,890 | 8/1987 | Stouffer et al. . | |
| 4,876,952 | 10/1989 | Kuno et al. . | |
| 4,915,021 | 4/1990 | Soethout . | |
| 4,970,947 | 11/1990 | Soethout . | |
| 5,036,753 | 8/1991 | Ostrand et al. . | |
| 5,063,833 | 11/1991 | Hara et al. . | |
| 5,120,272 | 6/1992 | Soethout et al. | 454/155 |
| 5,188,561 | 2/1993 | Hissimoff et al. | 454/315 X |
| 5,230,654 | 7/1993 | Bloomer | 454/155 |

FOREIGN PATENT DOCUMENTS

| | | | |
|---|---|---|---|
| 479734 | 4/1992 | European Pat. Off. . | |
| 2619438 | 2/1989 | France | 454/155 |
| 2553196 | 6/1977 | Germany . | |
| 2910125 | 9/1980 | Germany | 454/315 |
| 3044289 | 6/1982 | Germany | 454/155 |
| 4136822 | 5/1993 | Germany . | |

*Primary Examiner*—Harold Joyce
*Attorney, Agent, or Firm*—Roger L. May; Raymond L. Coppiellie

[57] ABSTRACT

A barrel type air outlet is provided for an opening in an instrument panel or other panel or compartment of a vehicle. The air outlet contains two sets of stationary vanes for directing a stream of air. The first set of stationary vanes is oriented parallel to the longitudinal and transverse axes of the barrel and to one another to direct the stream of air in a jet flow pattern. The second set of stationary vanes is oriented parallel to the longitudinal axis and nonparallel to the transverse axis and nonparallel to one another to direct the stream of air in a diffuse pattern to avoid direct impingement of the stream of air on the driver or other occupants of the vehicle.

12 Claims, 2 Drawing Sheets

AIR OUTLET REGISTER FOR AN OPENING IN A VEHICLE

This is a continuation of application Ser. No. 08/311,990, filed Sep. 26, 1994 abandoned.

FIELD OF THE INVENTION

The present invention relates to an air outlet register for a vehicle for delivering conditioned air.

BACKGROUND OF THE INVENTION

In an automobile, an air conditioning system controls the interior temperature. When the interior temperature reaches a comfortable level during cool down, one of the first adjustments typically made to the climate control settings is adjusting the air outlet registers to deflect the stream of air to avoid direct impingement of the stream of air on the bodies of the driver and passengers. As the air conditioning system further cools the interior space of the automobile, the blower speed and the temperature settings are adjusted along with subsequent adjustments of the air outlet vane orientation to maintain comfort without concentrated impingement of air on the driver or other occupants. It is desirable to control the interior environment to avoid direct impingement of the stream of air on the body with a minimum of adjustments.

Diffuser registers help alleviate the problem of repetition of adjustments by allowing an occupant to select a diffuse stream of air to minimize the sensation of impingement thereby eliminating or reducing the need to further adjust the climate control settings. Unfortunately, many diffuser registers have numerous moving parts which complicate the manufacturing process making them more expensive. Also, increasing the number of parts in an air register decreases the reliability of the register. Accordingly, it will be appreciated that it would be highly desirable to have an air register that could provide a diffuse stream of conditioned air and that is simple to manufacture and relatively inexpensive.

SUMMARY OF THE INVENTION

The present invention is directed to overcoming one or more of the problems set forth above. Briefly summarized, according to one aspect of the present invention, an air outlet for an opening in a vehicle comprises an elongated body having first and second end portions, a hollow interior, a front outer peripheral surface having a front opening and extending between the first and second end portions, a rear outer peripheral surface having a rear opening and extending between the first and second end portions, a longitudinal axis and a transverse axis. A first set of stationary vanes is oriented parallel to the longitudinal and transverse axes and to one another and extend in the front opening between the first and second end portions and extend from the outer peripheral surface into the hollow interior of the body to thereby direct a flow of air entering the rear opening across the first set of stationary vanes and through the from opening in a single direction. A second set of stationary vanes is oriented parallel to the longitudinal axis and nonparallel to the transverse axis and to one another and extend in the front opening between the first and second end portions and extend from the outer peripheral surface into the hollow interior of the body to thereby direct a flow of air entering the rear opening across the second set of stationary vanes and through the front opening in a multiple directions. The elongated body is pivotal between a first position at which the first set of stationary vanes directs the flow of air through the vehicle opening and a second position at which the second set of stationary vanes directs the flow of air through the vehicle opening.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
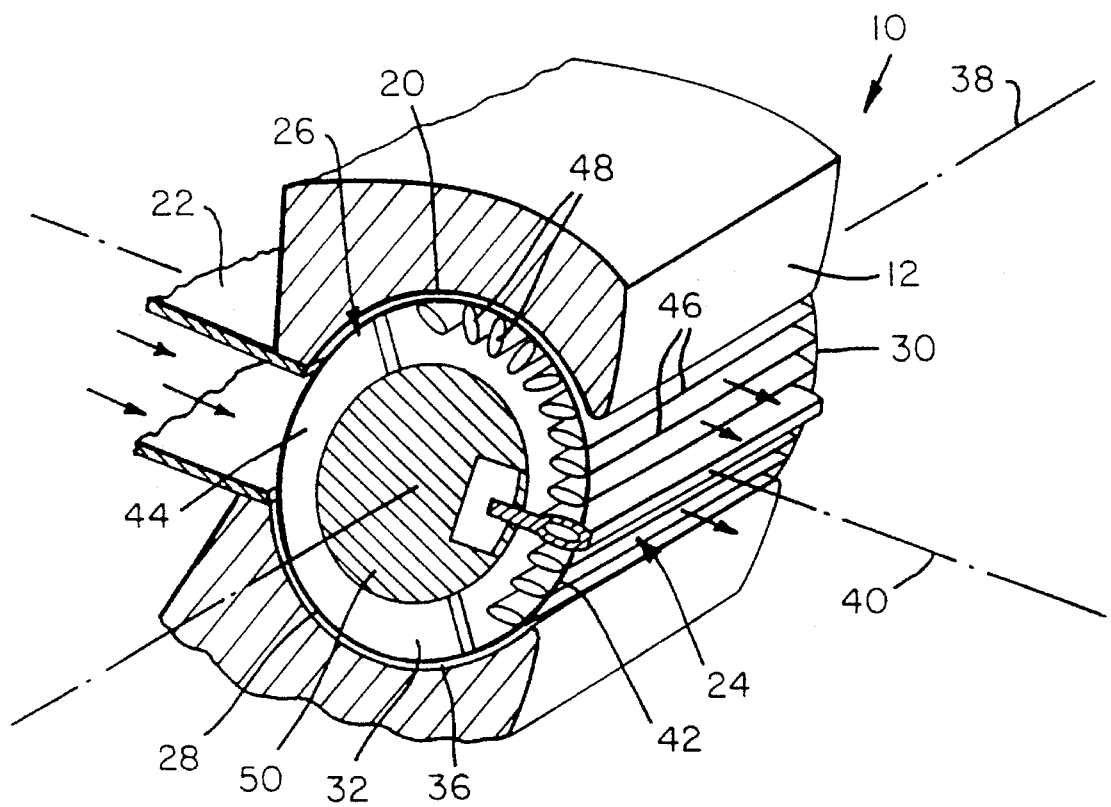
FIG. 1 is a diagrammatic cross-sectional view of a preferred embodiment of an air outlet register set for a jet stream of air and mounted in an instrument panel of a vehicle according to the present invention.
Figure 2:
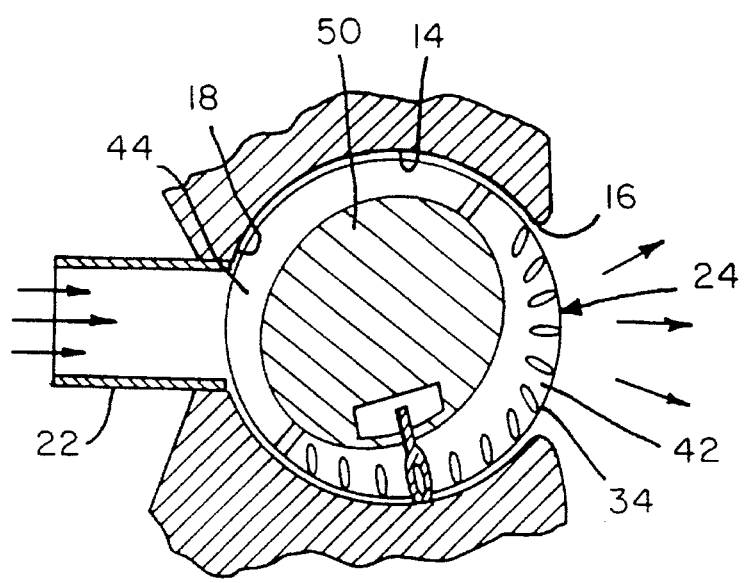
FIG. 2 is a cross-sectional view similar to FIG. 1 but with the air outlet register set for a diffuse stream of air.

Referring to FIGS. 1 and 2, a vehicle 10, such as an automobile for example, has an instrument panel 12 or other panel or compartment that has an opening 14 with from and rear portions 16, 18 and a middle portion 20 intermediate the front and rear portions 16, 18. An air duct 22 is attached to the instrument panel 12 about the rear portion 18 of the instrument panel opening 14 to deliver a stream of air from a blower of the air conditioning system to the instrument panel 12. The direction of flow of the stream of air is indicated by arrows and is from air duct 22 through the rear opening 18, the middle portion 20 and out through the front portion 16 where it enters the interior space of the vehicle.

The opening 14 houses a barrel type air outlet 24. The air outlet 24 has an elongated barrel shaped body 26 that has first and second end portions 28, 30, a hollow interior 32, a front outer peripheral surface 34, a rear outer peripheral surface 36, a horizontally extending longitudinal axis 38, and a horizontally extending transverse axis 40. The front outer peripheral surface 34 has a front opening 42 and the rear outer peripheral surface has a rear opening 44. The front outer peripheral surface 34 extends between the first and second end portions 28, 30 and the rear outer peripheral surface 36 also extends between the first and second end portions 28, 30. When installed in the opening 14, the elongated body 26 has its front opening 42 coextensive with the front portion 16 of the opening 14 and its rear opening 44 coextensive with the rear portion 18 of the opening 14 so that the flow of air from the air duct 22 may enter the rear opening 44 and exit the front opening 42 to direct the flow of air from the air duct 22 to the interior of the vehicle.

Each vane in a first set of stationary vanes 46 is oriented parallel to the longitudinal and transverse axes 38, 40 and the vanes are therefore oriented parallel to one another. The first set of stationary vanes 46 extends in the from opening 42 of the front outer peripheral surface 34 between the first and second end portions 28, 30 and extends from the outer peripheral surface 34 into the hollow interior 32 of the elongated body 26 to thereby direct the flow of air entering the rear opening 44 from the air duct 22 across the first set of stationary vanes 46 and through the front opening 42 in a single direction. This flow of air is termed a jet because the full force of the flow of air exiting vanes 46 is in a single direction which can be aimed or directed by the driver or other occupant of the vehicle.

Each vane in a second set of stationary vanes 48 is oriented parallel to the longitudinal axis 38 but is not parallel to the transverse axis 40. The vanes 48 extend in the front opening 42 of the front outer peripheral surface 34 between the first and second end portions 28, 30 and extend from the outer peripheral surface 34 into the hollow interior 32 of the elongated body 26 to thereby direct and disperse the flow of air entering the rear opening 44 from the air duct 22 across the second set of stationary vanes 48 and through the front opening 42. This flow of air is termed a diffuse flow because the full force of the flow of air is not in a single direction but is diffuse in several directions. A diffuse flow of air minimizes impingement on the bodies Of the occupants.

The elongated body 26 is pivotally movable between a first position, at which the first set of stationary vanes 46 directs the air flow through the opening 14, and a second position at which the second set of stationary vanes 48 directs the flow of air through the opening 14 for a diffuse flow. Preferably, the elongated body pivots about 90° from first position to the second position to change the flow of air from a jet exiting the first set of stationary vanes 46 to a diffuse flow exiting the second set of stationary vanes 48. The body may also be pivoted to a closed position. The barrel body may be pivoted manually with the fingers or a thumbwheel or other device may be used.

Still referring to FIGS. 1 and 2, a set of movable vanes 50 is positioned in the hollow interior to direct the flow of air horizontally along the longitudinal axis 38.

Figure 3:
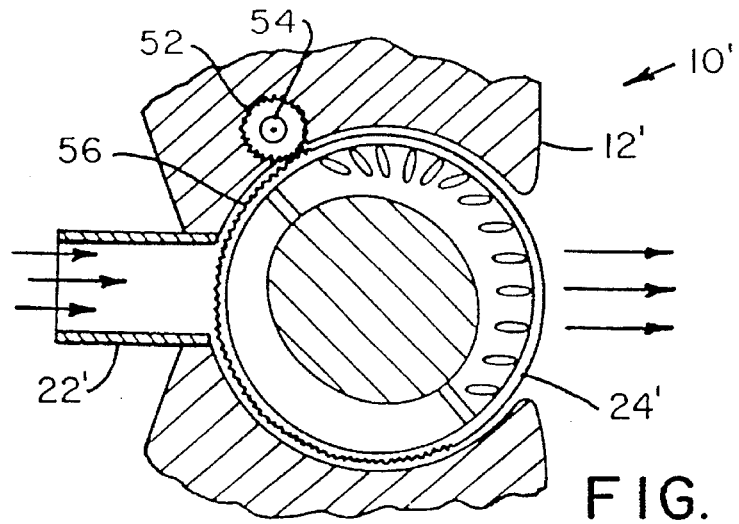
FIG. 3 is a cross-sectional view similar to FIG. 1 but illustrating another preferred embodiment.
Figure 4:
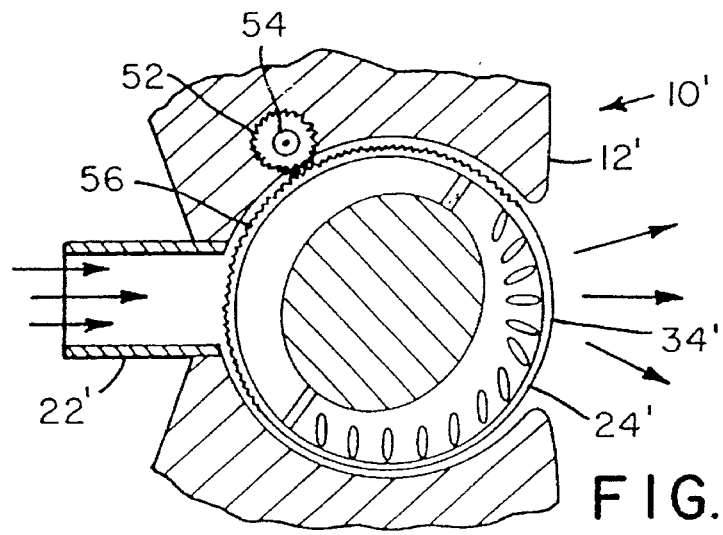
FIG. 4 is a cross-sectional view similar to FIG. 1 but with the air outlet register set for a diffuse stream of air.
Figure 5:
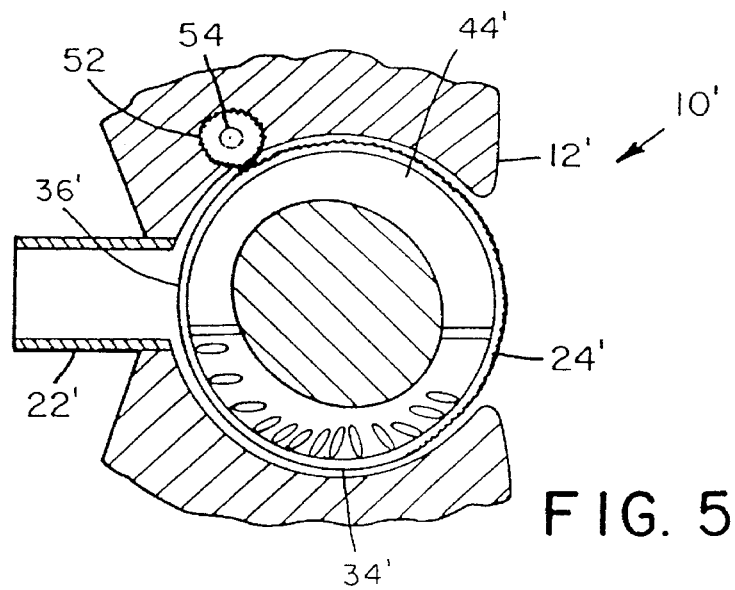
FIG. 5 is a cross-sectional view similar to FIGS. 3 and 4 but with the air outlet register set to block the stream of air.

Referring to FIGS. 3–5, means, such as a motor 52, are provided for pivoting the elongated body of the air outlet 24' between first, second and third positions. At the first position, the first set of stationary vanes directs the air flow through the opening of the panel 12' of the vehicle 10'. At the second position, the second set of stationary vanes directs the flow of air through the panel opening for a diffuse flow. At the third position, a portion of the rear outer peripheral surface 36' lies in the rear portion of the panel opening at the mouth of the air duct thereby blocking the flow of air from the air duct 22' to the interior of the vehicle while the portion of the rear outer peripheral surface containing the rear opening 44' lies against the upper portion of the instrument panel. Preferably, the motor 52 has an engagement member 54 for contacting an engagement portion 56 of the front and rear outer peripheral surfaces 34', 36' to pivot the elongated member between the first, second and third positions. Preferably, the elongated body pivots about 90° from first position to the second position to change the flow of air from a jet exiting the first set of stationary vanes to a diffuse flow exiting the second set of stationary vanes. The body pivots about 45° from the second position to third position to change the flow of air from a diffuse flow exiting the second set of stationary vanes to a blocked flow blocked at the mouth of the air duct 22' at the rear portion of the opening 14'.

Operation of the present invention is believed to be apparent from the foregoing description and drawings, but a few words will be added for emphasis. During initial cool down, the air outlet directs a jet of air to the interior of the vehicle. The movable vanes, when present, are adjusted by the occupant to direct the jet horizontally as desired. Selection of the first or second set of stationary vanes may be achieved by a motor controlled by the occupant, by use of a thumbwheel or manually by manipulating the barrel. When a switch is present, the driver manipulates the switch to activate the motor which pivots the air register to deliver air through the second set of stationary vanes thereby providing a diffuse flow which avoids impingement of the air on the occupants. The switch may be further manipulated to block the flow of air.

It can now be appreciated that there has been presented a barrel type air outlet for an opening in an instrument panel of a vehicle. The air outlet contains two sets of stationary vanes for directing a stream of air. The first set of stationary vanes is oriented parallel to the longitudinal and transverse axes of the barrel and to one another to direct the stream of air in a jet flow pattern. The second set of stationary vanes is oriented parallel to the longitudinal axis and nonparallel to the transverse axis and nonparallel to one another to direct the stream of air in a diffuse pattern to avoid direct impingement of the stream of air on the driver.

While the invention has been described with particular reference to an automobile, it is apparent that the air vent is easily adapted to other vehicles. As is evident from the foregoing description, certain aspects of the invention are not limited to the particular details of the examples illustrated, and it is therefore contemplated that other modifications and applications will occur to those skilled in the art. For example, the air outlet register is shown mounted horizontally but may be oriented in other directions. It is accordingly intended that the claims shall cover all such modifications and applications as do not depart from the true spirit and scope of the invention.

What is claimed is:

1. An air outlet for an opening in a vehicle, comprising:

an elongated body having first and second end portions, a hollow interior, a front outer peripheral surface having a front opening and extending between said first and second end portions, a rear outer peripheral surface having a rear opening and extending between said first and second end portions, a longitudinal axis and a transverse axis;

a first set of stationary vanes oriented parallel to said longitudinal and transverse axes and to one another and extending in said front opening between said first and second end portions and extending from said outer peripheral surface into said hollow interior of said body;

a second set of stationary vanes with individual vanes oriented parallel to said longitudinal axis, nonparallel to said transverse axis and nonparallel to one another, said second set of stationary vanes extending in said front opening between said first and second end portions and extending from said outer peripheral surface into said hollow interior of said body; and means for pivoting said elongated body between a first position at which said first set of stationary vanes is aligned with said rear opening along said transverse axis to receive a direct, linear flow of air exiting said rear opening to direct said flow of air across said first set of stationary vanes and through said from opening in a single direction, and a second position at which said second set of stationary vanes is aligned with said rear opening along said transverse axis to receive a direct, linear flow of air exiting said rear opening to direct said flow of air across said second set of stationary vanes and through said from opening in multiple directions.

2. An air outlet, as set forth in claim 1, wherein said means for pivoting said elongated body includes a motor engageable with a portion of said outer peripheral surface of said body to rotate said elongated body about 90°.

3. An air outlet, as set forth in claim 1, including a set of movable vanes positioned in said hollow interior to direct said flow of air vertically relative to said transverse axis and across said first set of stationary vanes only.

4. An air outlet for a panel of a vehicle, said panel forming an opening, said air outlet comprising:

an elongated body having first and second end portions, a hollow interior, a front outer peripheral surface having a front opening and extending between said first and second end portions, a rear outer peripheral surface having a rear opening and extending between said first and second end portions, a longitudinal axis and a transverse axis;

a first set of stationary vanes oriented parallel to said longitudinal and transverse axes and to one another and extending in said front opening between said first and second end portions and extending from said outer peripheral surface into said hollow interior of said body;

a second set of stationary vanes with individual vanes oriented parallel to said longitudinal axis, nonparallel to said transverse axis and nonparallel to one another extending in said front opening between said first and second end portions and extending from said outer peripheral surface into said hollow interior of said body; and means for pivoting said elongated body between a first, second and third positions, at the first position said first set of stationary vanes is aligned with said rear opening along said transverse axis to receive a direct, linear flow of air exiting said rear opening to direct said flow of air across said first set of stationary vanes and through said front opening in a single direction, at the second position said second set of stationary vanes is aligned with said rear opening along said transverse axis to receive a direct, linear flow of air exiting said rear opening to direct said flow of air across said second set of stationary vanes and through said from opening in multiple directions, and at the third position said outer peripheral surface openings abut said vehicle panel and said rear outer peripheral surface blocks air flow through said vehicle panel opening.

5. An air outlet, as set forth in claim 4, wherein said body pivots about 90° when moving from said first position to said second position.

6. An air outlet, as set forth in claim 4, wherein said body pivots about 45° when moving from said second position to said third position.

7. A vehicle, comprising:

an instrument panel having an opening with front and rear portions and a middle portion intermediate said front and rear portions;

an air duct attached to said instrument panel about said rear portion of said instrument panel opening to deliver a flow of air thereto;

an elongated body having first and second end portions, a hollow interior, a front outer peripheral surface having a front opening and extending between said first and second end portions, a rear outer peripheral surface having a rear opening and extending between said first and second end portions, a longitudinal axis and a transverse axis;

a first set of stationary vanes oriented parallel to said longitudinal and transverse axes and to one another and extending in said front opening between said first and second end portions and extending from said outer peripheral surface into said hollow interior of said body;

a second set of stationary vanes with individual vanes oriented parallel to said longitudinal axis, nonparallel to said transverse axis and nonparallel to one another, said second set of stationary vanes extending in said front opening between said first and second end portions and extending from said outer peripheral surface into said hollow interior of said body; and means for pivoting said elongated body between a first position at which said first set of stationary vanes is aligned with said rear opening to receive a direct, linear flow of air exiting said rear opening to direct said flow of air across said first set of stationary vanes and through said front opening in a single direction, a second position at which said second set of stationary vanes is aligned with said rear opening to receive a direct, linear flow of air exiting said rear opening to direct said flow of air across said second set of stationary vanes and through said front opening in multiple directions, and a third position at which said outer peripheral surface blocks said rear portion of said instrument panel opening thereby blocking said flow of air through said air duct.

8. A vehicle, as set forth in claim 7, wherein said means for pivoting said elongated body includes a motor engageable with a portion of said outer peripheral surface of said body to rotate said elongated body about 135°.

9. A vehicle, as set forth in claim 7, wherein a portion of said outer peripheral surface forms an engagement surface and wherein said means for pivoting said elongated body includes a motor having an engagement member for contacting said engagement surface to pivot said elongated body.

10. A vehicle, as set forth in claim 7, including a set of movable vanes positioned in said hollow interior to direct said flow of air vertically relative to said transverse axis and across said first set of stationary vanes only.

11. A vehicle, as set forth in claim 7, wherein said body pivots about 90° when moving from said first position to said second position.

12. A vehicle, as set forth in claim 7, wherein said body pivots about 45° when moving from said second position to said third position.

* * * * *